3,576,643
METHOD OF CULTURING FISH AND
CRUSTACEA LARVAE
Yaichi Ayukawa, 1168 Okamotocho, Setagayaku; Uhei
Naruse, 1-3-1 Tamagawacho, Akishi-mashi; Tadayoshi
Itoh, 3-24-10 Haneda, Ohtaku; and Tsuneaki Miyakawa, 1-10-31 Kichijyoji, Musashinoshi, all of Tokyo,
Japan
No Drawing. Filed Mar. 28, 1969, Ser. No. 811,636
Int. Cl. A23k 1/00; A23j 1/18
U.S. Cl. 99—2
12 Claims

ABSTRACT OF THE DISCLOSURE

Covers a feed useful in culturing larval fish and crustacea which comprises a combination of starch and an extract of yeast, derived by treating yeast with ammonia or a similar basic substance, said feed acting as a means of culturing zooplankton which are assimilated by said larval fish and crustacea. Also covers a method of culturing larval fish and crustacea by supplying the above feed to the aqueous environment in which the larvae reside.

---

Commercially grown fish and crustacea are cultured by taking the hatched larvae and placing them in a suitable environment until they reach the adult stage. The natural feed of fish and crustacea larvae is zooplankton, such as Copepoda, Phyllopoda, Ostrapoda, Schizopoda, Amphipoda and Decapoda. It is important that during the early development of the fish or crustacea sufficient zooplankton are present of a type acceptable to the larvae. Thus, considerable effort has been expended in culturing the zooplankton taken by the fish or crustacea larvae as their feed. Without a proper and abundant source of zooplankton the larval fish or crustacea do not grow at a sufficient rate as desired and/or a considerable number of larvae do not survive this critical growth period. Thus, zooplankton of the desired type and of sufficient number must be provided, and is usually done so by furnishing various inorganic salts to the aqueous medium in which the larvae reside. In addition, waste liquors from various fermentation processes are added to culture the zooplankton utilized by the larvae as feed. However, to date, there has not been present a feed sufficient to meet the demands of both a high rate of growth and high percent survival of fish and crustacea larvae.

In view of the above, it therefore becomes an object of the invention to provide a feed suitable in culturing of zooplankton which in turn are assimilated by fish and crustacea larvae.

Another object of the invention is to provide the above feed which materially increases the growth rate of fish and crustacea, and as well provides a situation of high survival rate until the larvae reached the adult stage.

Still another object of the invention is to provide the above feed with its attendant advantages which yet is of sufficiently low cost to be attractive from a commercial standpoint.

Other objects will appear hereinafter.

In accordance with the invention a novel feed has been found which is useful in culturing fish and crustacea larvae. The feed which essentially provides sufficient and assimilable species of zooplankton as the natural feed of such larvae comprises a combination of starch and an extract of yeast derived by treating yeast with ammonia or another similar basic substance. Thus, the yeast extract may be one derived by treating yeast with aqueous solutions of sodium hydroxide, potassium hydroxide, etc. The ammonia extract of yeast is preferred and for purpose of simplicity the invention will be further described only with reference to ammonia, it being understood of course, that other basic extractants are equivalent to ammonia here.

The above feed which may contain other ingredients is supplied to the aqueous medium in which the larvae are grown and helps to provide zooplankton of the desired type and in sufficient amounts to promote the proper rate of growth and development of the larvae.

The feed preferably contains each of said ingredients of starch and ammonia extract of yeast in an amount ranging from about 40% by weight to about 60% by weight based on the weight of the combined two ingredients. A typical feed will contain equal parts of starch and an ammonia extract of yeast.

The starch may be derived from any vegetable source, such as, for example, corn, wheat, potato, tapioca, rice, sago and grain sorghum. Waxy starches may also be used. The term "starch" is used broadly herein and encompasses derivatized starch, unmodified starch and tailings, and, as well, starch that has been modified by treatment with acids, alkalies, enzymes, or oxidizing agents. In addition, high amylose starch, such as, for example, high amylose corn starch, may also be used. A high amylose starch may be prepared in several different ways. For example, it may be recovered from a hybrid corn that is rich in amylose, or it may be prepared by separating an amylose fraction from ordinary starch and blending the fraction with other starchy materials. Soluble or partially soluble modified starches, dextrins, pregelatinized products, and starch derivatives are also suitable. A preferred source of starch is a granular starch.

The ammonia extract of yeast is derived by treating yeast cells with ammonia, such as liquid ammonia, and thereafter driving off the ammonia from the extract to produce the useful feed component here.

A wire variety of yeasts may be treated as, for example, Candida utilis, C. tropicalis, C. arborea, Saccharomyces cerevisiae, Torulopsis utilis, Mycotorula japonica, Hansenula anomala, Zygosaccharomyces lactis, etc. A preferred yeast source which is treated to provide the extract used here is one commonly known as Torula yeast. Again, any yeast cells may be treated such as wet yeast, rolled dried yeast, spray dried yeast, and whole and ruptured yeast cells.

The following illustrates a typical means of achieving a useful extract of yeast. Both aqueous ammonia solutions and liquid ammonia may be used to extract the yeast and produce the useful feed component here. Liquid ammonia is preferred since it appears to more efficiently and completely extract components of yeast finding use as feed here.

The yeast cells are first immersed in liquid or aqueous ammonia while under a condition of mild agitation. In some instances the yeast cells may be extracted with ammonia via a number of repeated extractions, say from two up to about twenty extractions using fresh ammonia each time. The yeast cells are generally extracted 2–10 times with ammonia if the concept of repeated extractions is followed. In each instance the ammonia extract is then collected and combined. In another embodiment the yeast cells may be continuously extracted via known countercurrent extraction techniques.

The amount of liquid ammonia utilized in relation to the amount of yeast cells being treated will widely vary depending upon the type of extraction technique and other variables. Usually, the amount used in relation to the amount of yeast cells treated on a volume basis ranges from about 2 to about 4 times.

The time of contact of the ammonia with the yeast cells with ammonia will also widely vary depending upon a number of factors. Usually each contact time will be less than four hours, more often less than three hours, and in the usual case less than thirty minutes. Of course, as is noted above the yeast cells may be repeatedly contacted with ammonia. If a counter-current extraction technique is employed, this measurably increases the efficiency of the treatment, and decreases the time of contact necessary to obtain the sought-after ammonia extract of the yeast cells.

Treatment temperature should be below the boiling point of the ammonia, and when liquid ammonia is utilized the contact temperature should be below the boiling point (−33.4° C.) of liquid ammonia.

The yeast cells are then separated from the ammonia solution by conventional techniques. These may include decantation, filtration, centrifugation, etc.

The ammonia from the treatment step above which now contains useful extracted materials is then evaporated to produce the feed component used here. The extract is rich in useful vitamins and amino acids, which when supplied to the aqueous culture medium within which the larvae fish and crustacea larvae are growing produce abundant quantities of useful zooplankton.

The ammonia extract of yeast is then combined with starch to provide the useful feed. As noted above, other ingredients may also be added to the aqueous fish or crustacea culture medium. For example, inorganic salts, such as sodium bicarbonate, sodium hydrogen phosphate, sodium salts of ethylenediaminetetraacetic acids and inorganic salts of such metals as iron, manganese, zinc, molybdenum, copper and cobalt. Still other ingredients may compose part of the feed such as calcium carbonate, with this being a preferred adjunct to the essential feed components.

The following examples illustrate typical compositions of the invention and their utilization by either fish or crustacea and specifically brine shrimp.

EXAMPLE I

To 500 ml. of sea water containing 12 g. of sodium chloride was added 50 g. of a liquid ammonia extract of Torula yeast, 50 mg. of granular corn starch and 10 mg. of calcium carbonate. The feed was mixed in the salt water and thereafter adjusted to a pH for around 7.6. Then *Artemia salina* (brine shrimp) just hatched were cultured in this mixture at around 25° C. Fresh culture liquor was supplied every two days.

In this environment the shrimp grew to adults in six days and a substantial proportion of the shrimp began to bear eggs in eight days. The survival rate utilizing the feed of the invention was extremely high, namely 95%.

In a similar run involving yeast itself as a portion of the feed, rather than an ammonia extract of yeast it required approximately 20–25 days for the shrimp to grow to adult size.

Table I below shows the effect of utilizing starch and an ammonia extract of yeast upon the growth of brine shrimp compared to a like run involving untreated yeast plus starch and a still further run involving no addition of feed. It should be quite evident that the series of feeds involving the compositions of the invention were clearly superior in terms of extent of growth as well as survival rate.

TABLE I

| | Feed | | | | | |
|---|---|---|---|---|---|---|
| | Torula yeast without ammonia treatment plus CaCO₃ plus starch | | Liquid ammonia extract of Torula yeast plus CaCO₃ plus starch | | Sea water (4% sodium chloride) | |
| | Length (mm.) | Surviving rate (percent) | Length (mm.) | Surviving rate (percent) | Length (mm.) | Surviving rate (percent) |
| Culture period (days): | | | | | | |
| 1 | 0.84 | 100 | 0.95 | 100 | 0.51 | 95 |
| 3 | 3.0 | 95 | 5.0 | 95 | 2.0 | 90 |
| 6 | 3.8 | 83 | 8.2 | 95 | 3.0 | 72 |
| 8 | 4.8 | 62 | 11.0 | 95 | 4.0 | 54 |
| 20 | 9.3 | 39 | 12.6 | 74 | 10.8 | 41 |

EXAMPLE II

Here, to 500 ml. of sea water containing 12 g. of sodium chloride was added 50 mg. of the liquid ammonia extract of Saccharomyces yeast, 50 mg. of granular corn starch, and 10 mg. of calcium carbonate. 100 brine shrimp just hatched were then cultivated in the above liquid at a temperature of about 25–30° C. Again, fresh culture medium was supplied every two days. Here, after six days of culture the shrimp grew to adults. The surviving rate was a surprising 100%.

Table II shows the results of this run compared to a like run involving untreated yeast in combination with starch. Again, it can readily be seen that by utilizing a liquid ammonia extract of yeast in combination with starch surprising results were realized with respect to the growth of brine shrimp, both as to their overall size and their rate of survival.

TABLE II

| | Feed | | | |
|---|---|---|---|---|
| | Saccharomyces yeast without ammonia treatment plus CaCO₃ plus starch | | Liquid ammonia extract of saccharomyces yeast plus CaCO₃ plus starch | |
| | Length (mm.) | Surviving rate (percent) | Length (mm.) | Surviving rate (percent) |
| Culture period (days): | | | | |
| 4 | 5.6 | 89 | 5.1 | 100 |
| 6 | 5.7 | 54 | 9.5 | 100 |
| 10 | 6.8 | 52 | 14.0 | 98 |
| 20 | 8.9 | 29 | ---------- | 63 |

EXAMPLE III

Brine shrimp were grown utilizing the feed of Example I with the exception that in each six day culture period varying amounts of calcium carbonate was utilized. As is evident from Table III below, optimum results were realized in terms of survival rate when about 10 mg. of calcium carbonate was added per 50 mg. of liquid ammonia extract of yeast. Results are given below.

TABLE III

| Amount of liquid ammonia extract of Torulo yeast (mg.) | Amount of CaCO₃ (mg.) | Adulthood reached (days) | Survival rate to adulthood |
|---|---|---|---|
| 50 | 0 | 6 | 60 |
| 50 | 1 | 6 | 71 |
| 50 | 5 | 6 | 85 |
| 50 | 10 | 6 | 97 |
| 50 | 15 | 6 | 83 |
| 50 | 20 | 6 | 80 |

EXAMPLE IV

Here, instead of brine shrimp a particular fish species was cultivated from the larval stage. Specifically, 100 *Dalphnia pulex* just hatched were cultivated at around 25° C. in a medium prepared by adding 50 mg. of an ammonia extract of Torula yeast, 50 mg. of granular starch and 10 mg. of calcium carbonate to 500 ml. of fresh water. Again fresh media was supplied every two days. During a total of 5 days of culture the fish grew to adult size, approximately 3mm. in length. The survival rate was 93%.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. A method of culturing larval fish and crustacea which comprises supplying as a feed to the aqueous environment in which said larvae reside a combination of starch $CaCO_3$ and an extract of yeast derived by treating said yeast with a basic material selected from the group consisting of ammonia, and aqueous solutions of sodium and potassium hydroxide, said feed acting as a means of culturing zooplankton which are assimilated by said larval fish and crustacea.

2. A method of culturing larval fish and crustacea which comprises supplying as a feed to the aqueous environment in which said larvae reside a combination of starch $CaCO_3$ and an ammonia extract of yeast, said feed acting as a means of culturing zooplankton which are assimilated by said larval fish and crustacea.

3. The method of claim 2 wherein said method is applied to the culture of brine shrimp.

4. The method of claim 2 wherein said starch is a granular starch.

5. The method of claim 4 wherein said ammonia extract of yeast is an extract derived by treating yeast with liquid ammonia.

6. The method of claim 2 wherein said yeast is a Torula yeast.

7. The method of claim 2 wherein each of said starch and said ammonia extract of yeast ingredients are present in said feed in an amount ranging from about 40% by weight to about 60% by weight based on the combined weight of said starch and said ammonia extracted yeast.

8. A feed useful in culturing larval fish and crustacea which comprises a combination of starch $CaCO_3$ and an ammonia extract of yeast, said feed acting as a means of culturing zooplankton which are assimilated by said larval fish and crustacea.

9. The feed of claim 8 wherein said starch is a granular starch.

10. The feed of claim 9 wherein said ammonia extract of yeast is an extract derived by treating yeast with liquid ammonia.

11. The feed of claim 8 wherein said yeast is a Torula yeast.

12. The feed of claim 8 wherein each of said starch and said ammonia extract of yeast ingredients are present in an amount ranging from about 40% by weight to about 60% by weight based on the combined weight of said starch and said ammonia extract of yeast.

References Cited

UNITED STATES PATENTS

| | | | |
|---|---|---|---|
| 2,233,251 | 2/1941 | Praghi | 99—96 |
| 3,278,812 | 10/1966 | Griffon et al. | 99—96 |
| 3,051,576 | 8/1962 | Lendvai | 99—97 |

OTHER REFERENCES

Encyclopedia Britannica, "Plankton," vol. 17, pp. 1006–1007, 1957.

N. V. Pridatkina: Biological Abstracts, vol. 49, October 1968, article 98320.

NORMAN YUDKOFF, Primary Examiner

C. P. RIBANDO, Assistant Examiner

U.S. Cl. X.R.

99—3, 97

UNITED STATES PATENT OFFICE
CERTIFICATE OF CORRECTION

Patent No. 3,576,643                    Dated April 27, 1971

Inventor(s) Yaichi Ayukawa et al.

It is certified that error appears in the above-identified paten and that said Letters Patent are hereby corrected as shown below:

In the heading to the printed specification, after 1 8, insert -- assignors, by mesne assignments to CPC International Inc., a corporation of Delaware --.

Signed and sealed this 19th day of October 1971.

(SEAL)
Attest:

EDWARD M. FLETCHER, JR.                ROBERT GOTTSCHALK
Attesting Officer                       Acting Commissioner of Pate